United States Patent [19]

Krall et al.

[11] Patent Number: 5,087,406

[45] Date of Patent: Feb. 11, 1992

[54] METHOD FOR MAKING A MULTI-LAYER PLASTIC CONTAINER WITH A HANDLE

[75] Inventors: Thomas J. Krall, Toledo; Robert A. Myers, Perrysburg, both of Ohio

[73] Assignee: Owens-Illinois Plastic Products Inc., Toledo, Ohio

[21] Appl. No.: 489,122

[22] Filed: Mar. 5, 1990

[51] Int. Cl.[5] .............................................. B29C 49/22
[52] U.S. Cl. ..................................... 264/512; 264/515; 264/523; 264/536; 264/540; 425/523; 425/525; 215/1 C; 215/100 A
[58] Field of Search ............. 264/512, 515, 536, 527, 264/540, 523; 425/525, 523, 527; 215/1 C, 100 A

[56] References Cited

U.S. PATENT DOCUMENTS

| | | | |
|---|---|---|---|
| 2,991,500 | 7/1961 | Hagen | 425/527 |
| 3,366,290 | 1/1968 | Mojannier et al. | 215/1 C |
| 3,444,285 | 5/1969 | Mason | 264/536 |
| 3,892,828 | 7/1975 | Weatherly et al. | 264/536 |
| 4,079,850 | 3/1978 | Suzuki et al. | 215/1 C |

FOREIGN PATENT DOCUMENTS

| | | | |
|---|---|---|---|
| 40-2265 | 2/1940 | Japan | 264/515 |
| 58-171328 | 10/1983 | Japan | 264/512 |

Primary Examiner—Jan H. Silbaugh
Assistant Examiner—Catherine Timm

[57] ABSTRACT

The method and apparatus for making a multi-layer plastic container with an integral handle for holding liquids and the like by enclosing a hollow parison of molten plastic which is at a blow molding temperature, pinching a portion of the hollow parison as the mold clses to form a hollow moil portion and neck portion, simultaneously pinching a portion of the hollow parison to form a hollow handle portion while leaving a portion of the parison to provide a passage from the moil poriton to the handle portion and the expanding the parison by supplying gaseous pressure to the moil portion and from the moil portion to form the container from the moil portion through the passage to form the handle.

3 Claims, 5 Drawing Sheets

METHOD FOR MAKING A MULTI-LAYER PLASTIC CONTAINER WITH A HANDLE

This invention relates to blow molding hollow plastic articles and particularly to blow molding hollow plastic articles with integral handles.

BACKGROUND AND SUMMARY OF THE INVENTION

In the blow molding of hollow plastic articles, it has been common to close a hot tube within a mold and blow a hollow container with an integral handle. Where the tube comprises a single layer of plastic, this is readily achieved by pinching off the plastic in the area that forms the hollow of the handle. However, where a multi-layer plastic is desired, as, for example, where there is an intermediate plastic layer required for providing properties such as permeability or other properties as, for example, are required for containing solvent based products, it has been found that in order to weld the pinch off areas, a large and unsightly pinch off must be provided which not only is unsightly but forms a seam line that makes the handle uncomfortable to hold. In addition, this construction weakens the drop test performance of the container.

Accordingly, among the objectives of the present invention are to provide a method and apparatus for forming multi-layer containers having an integral handle which provide for proper pinch off; which avoid large uncomfortable and unsightly pinch offs; which have adequate drop test performance; and which minimize the number of handling steps in the formation of the bottle.

In accordance with the invention the method and apparatus for making a multi-layer plastic bottle with a handle for holding liquids and the like comprises enclosing a hollow parison of molten plastic which is at a blow molding temperature, pinching a portion of the hollow parison as the mold closes to form a hollow moil portion, simultaneously pinching a portion of the hollow parison to form a hollow handle portion while leaving a portion of the parison to provide a passage from the moil portion to the handle portion and thereafter expanding the parison through the moil portion to form the container.

DESCRIPTION

Figure 1:
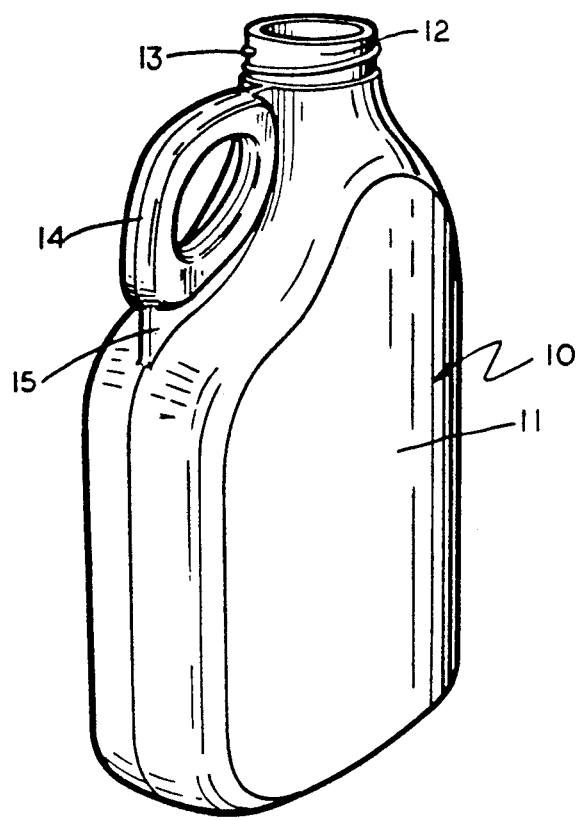
FIG. 1 is a perspective view of a container embodying the invention.

Referring to FIG. 1, the container 10 made in accordance with the invention comprises a hollow body 11 having a neck or finish 12 with fastening means for engaging a cap such as threads 13 thereon, an integral hollow handle 14 and a wall 15 connecting the handle 14 to the body 11.

Figure 2:
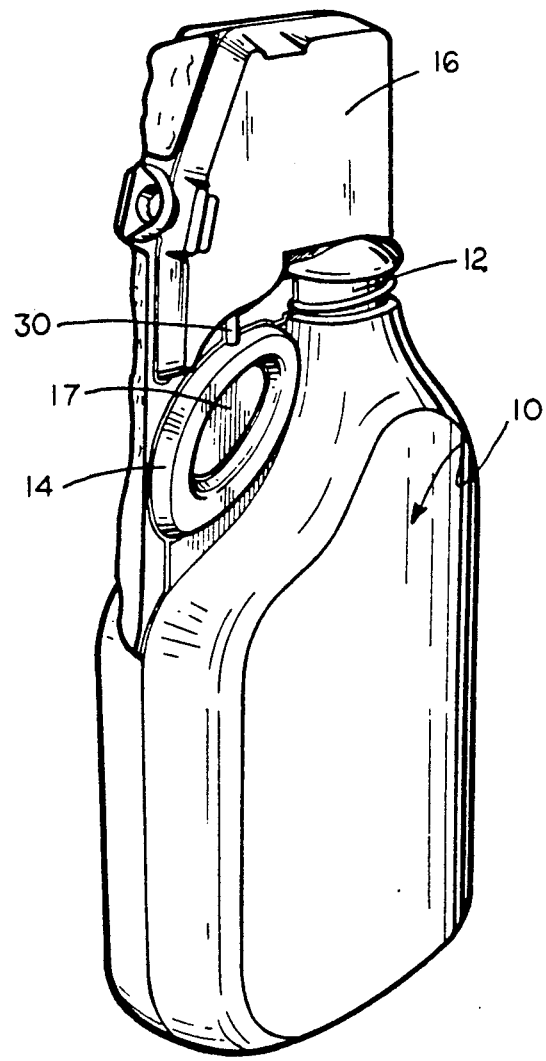
FIG. 2 is a perspective view of the container after it is blown and prior to being trimmed.
Figure 4:
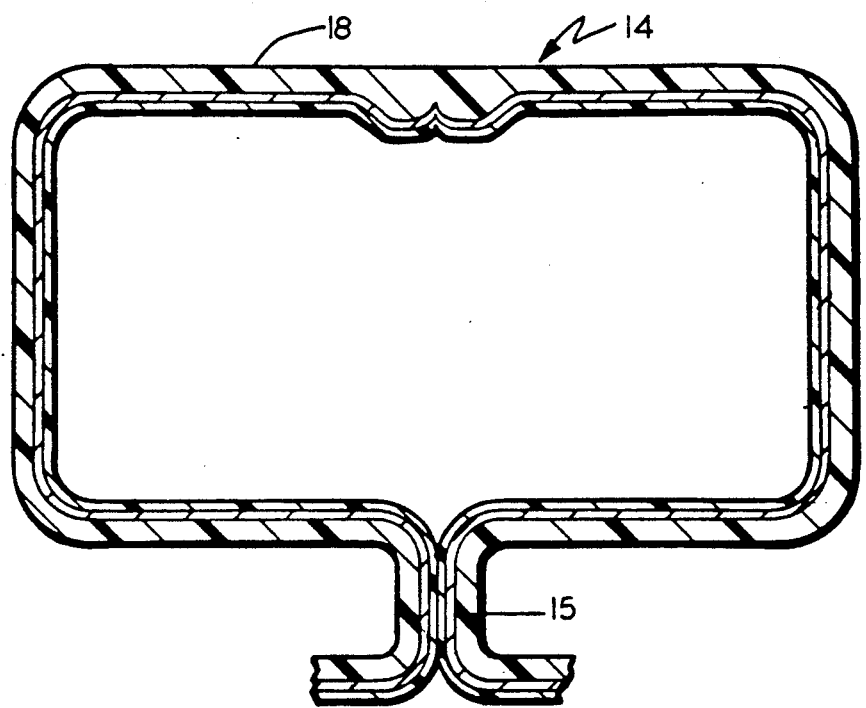
FIG. 4 is a fragmentary sectional view taken along the line 4—4 in FIG. 3.
Figure 3:
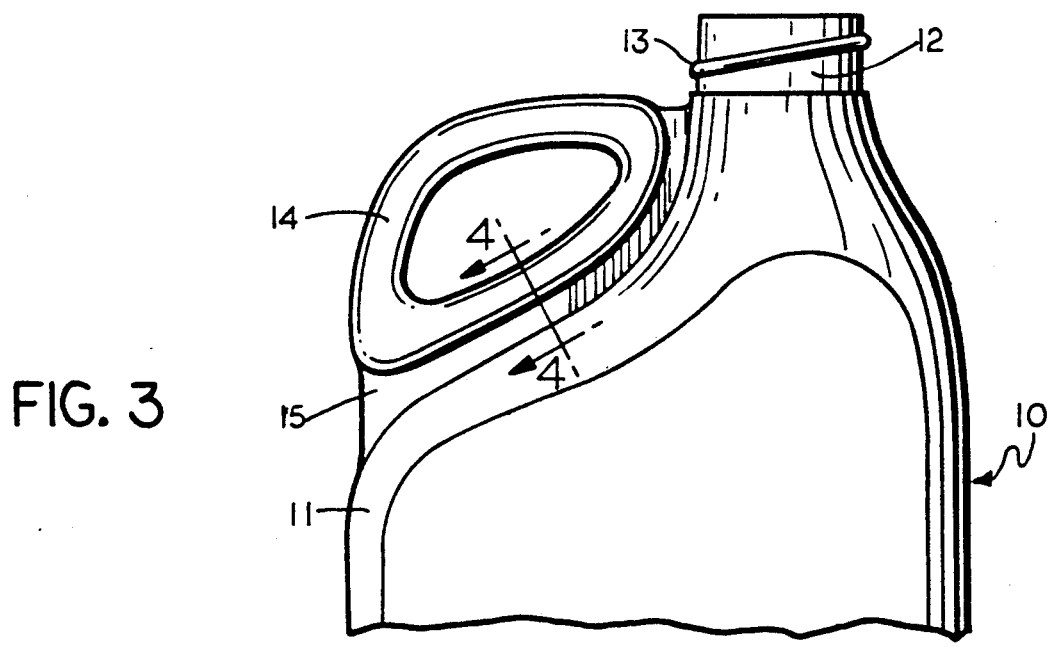
FIG. 3 is a fragmentary elevational view of the container.
Figure 7:
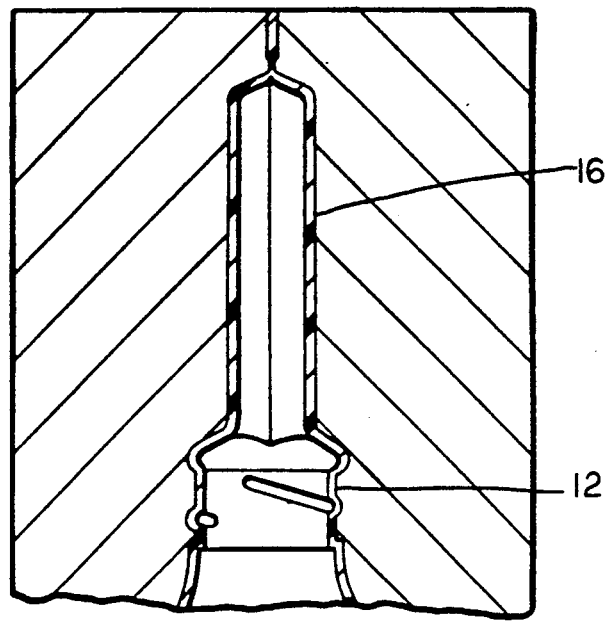
FIG. 7 the fragmentary sectional view taken along the line 7—7 in FIG. 6 with the other mold section in position.
Figure 8:
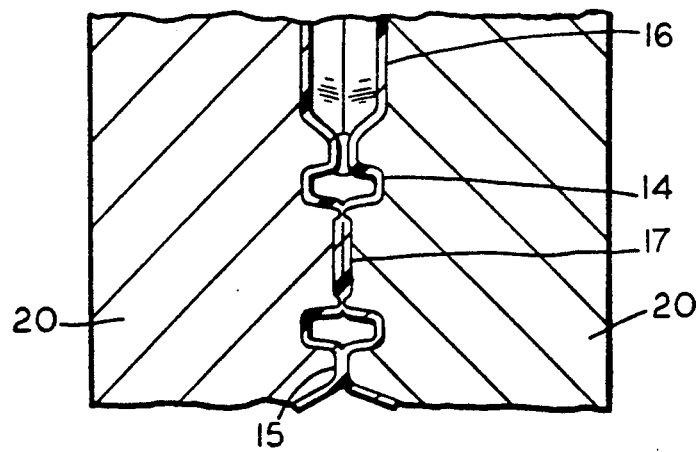
FIG. 8, is a fragmentary sectional view taken along the line 8—8 in FIG. 6 with the other mold section in position.

Referring to FIG. 2, as the container 10 is formed, as presently described, it includes a hollow moil portion 16 which is connected to both the handle portion 14 and the finish 12 (FIG. 7). In addition, flat plastic portion 17 closes the finger receiving opening of the handle (FIG. 8). The container thus must be trimmed to provide the configuration such as shown in FIG. 3 by removing the moil portion 16 and plastic portion 17. As can be seen from FIG. 4 which is an greatly enlarged section through the handle, the handle 14 is a multi-layer handle having a smooth continuous surface 18 and the layers of plastic are joined to form the doubled layered wall 15 that connects the handle to the body 11 of the container 10. The container is formed by expanding a parison within the sections of a mold.

Figure 5:
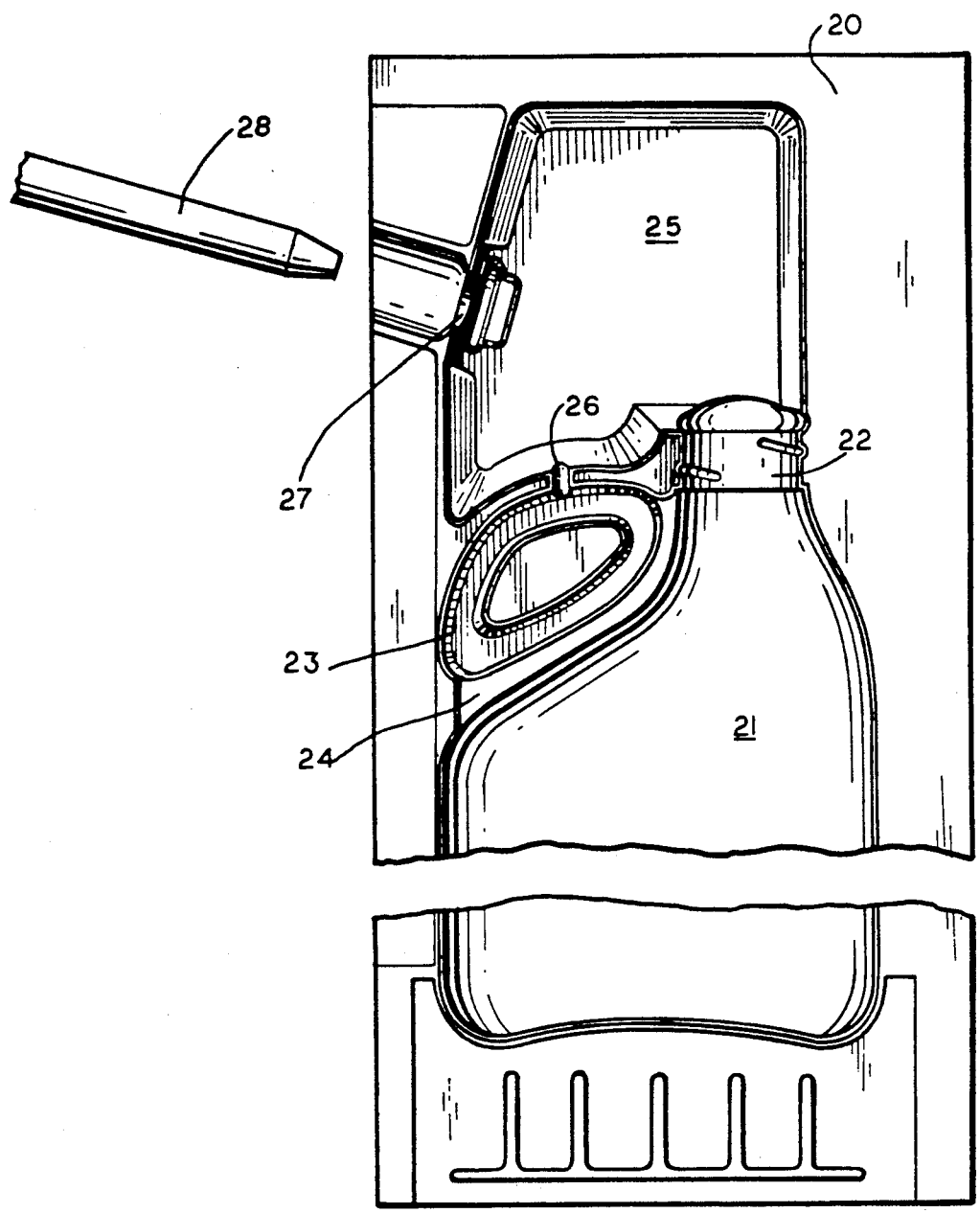
FIG. 5 is a fragmentary plan view of a mold for forming the container.
Figure 6:
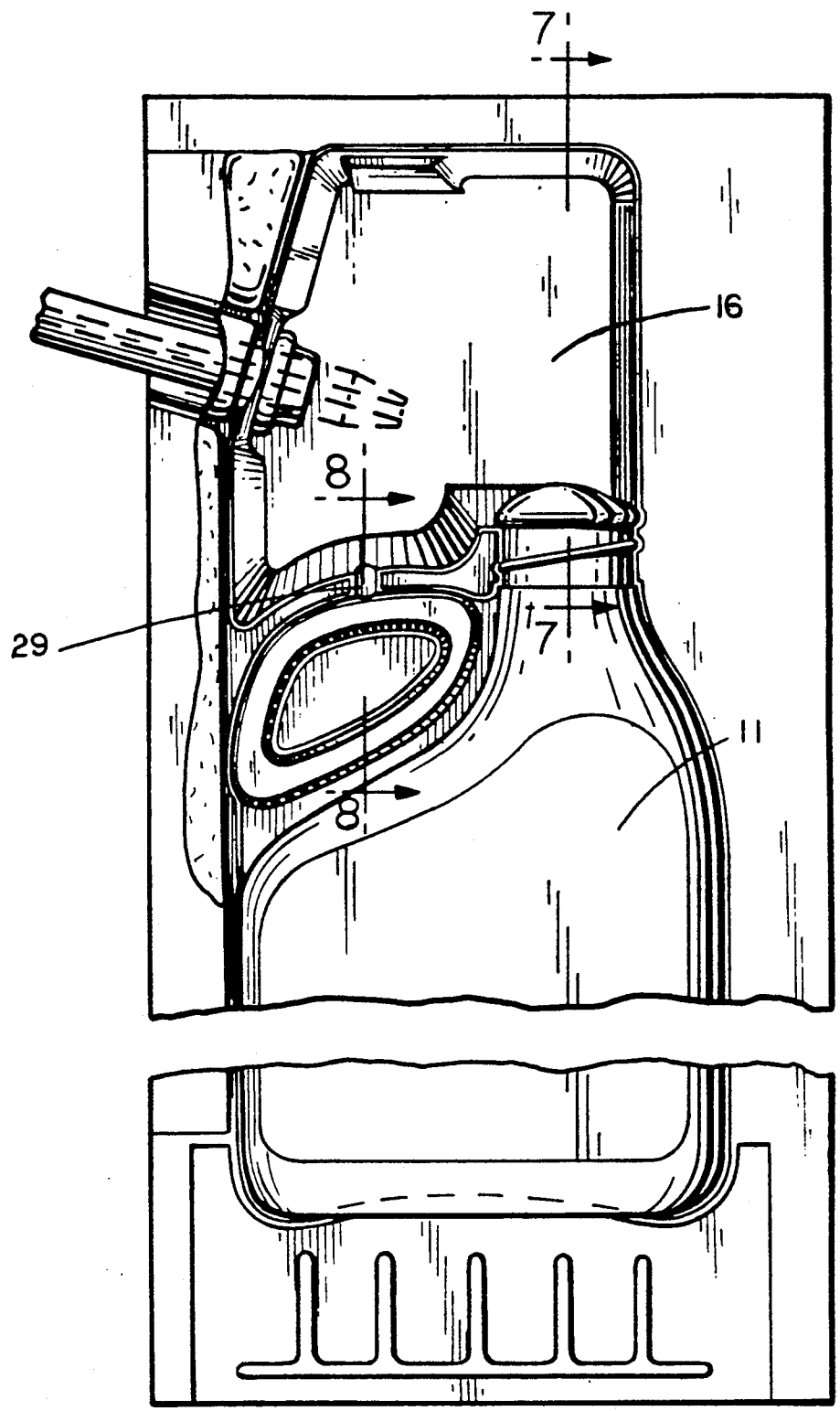
FIG. 6 is a fragmentary plan view showing the container in a mold section after it has been blown.

Referring to FIG. 5, one mold section 20 is shown and comprises a hollow portion 21 which is adapted to define the body of the container, a generally semi-circular portion 22 adapted to define the finish 12, a continuous groove 23 for defining part of the handle, a shallow groove 24 for defining the wall 15 and an upper cavity 25 for defining part of the moil portion 16. The mold section 20 further includes a small groove 26 for providing communication between the moil cavity 25 and the groove 23. Finally, the section 20 includes a guide portion 27 for receiving a blow pipe 28. The parison may comprise an extruded tube of plastic at blow molding temperature. When the sections of the mold are closed about the parison, the lower portion of the parison is pinched by a severe pinch off for defining the body 11 of the container, the upper portion is pinched for defining the moil portion 16, an intermediate portion is pinched for defining the handle 14, the wall 24 and the portion 17 while the grooves 26 defines a passage 30 between the moil portion 25 and the handle portion 23. Thus when the blow pipe 28 is inserted to blow the container, as shown in FIG. 6, the expanding fluid can flow from the interior of the hollow moil 16 to the interior of the body 11 and also through the hollow portion 29 defined by the passage 30 to the interior of the handle so that the handle is blown outwardly.

After the blow molding, the container is removed from the mold and trimmed by severing the moil portion 16, wall portion 17 and trimming the finish 12.

The resultant container has a handle which does not have a rough seam line in the area of the upper portion of the handle (FIG. 4) which is engaged by the fingers. The severe pinch off in the wall 15 required for maintaining properties, such as permeability, is at the area not engaged by the fingers. Therefore, the container is more comfortable to hold and is not unsightly, has adequate drop test performance and has been made with a minimum of handling steps.

We claim:

1. The method for making a plastic container which comprises
   providing a hollow parison of molten plastic material at a blow molding temperature,
   pinching a portion of the hollow parison between mold sections to form a hollow moil portion, an integral neck portion and a body forming portion, said moil portion communicating with said body portion through said neck portion, forming an integral hollow handle portion connected to said body portion during said pinching by a first integral double layer wall portion, said first integral wall portion isolating said handle portion from said body portion, said handle portion being connected to the moil portion by a second integral double layer wall portion, and forming a passage between the layers of said second wall portion during said pinching of the hollow parison, said passage extending between the moil portion and said handle portion, thereafter expanding the parison by applying gaseous pressure to the moil portion such that gaseous pressure passes through the moil portion to the neck portion then through the neck portion to the body portion to form the container and through the moil portion to the passage in said second wall portion then through said passage to the handle portion to expand the handle portion wherein gaseous pressure is applied to the handle portion only from said passage in said second wall portion.

2. The method set forth in claim 1 wherein said step of providing a hollow parison comprises providing a multi-layer parison, said step of pinching said hollow parison to form a handle portion being such as to form said first integral double layer wall portion which connects the body portion and the handle portion such that the double layer wall comprises continuous multilayers that connect the handle portion and body portion.

3. The method set forth in any one of claims 1 and 2 including the step of trimming the hollow moil portion, the neck portion and the various areas surrounding the handle.

* * * * *